Feb. 5, 1935.  E. A. LOWE ET AL  1,990,339
GATE VALVE SUPERVISORY DEVICE
Filed Aug. 31, 1932
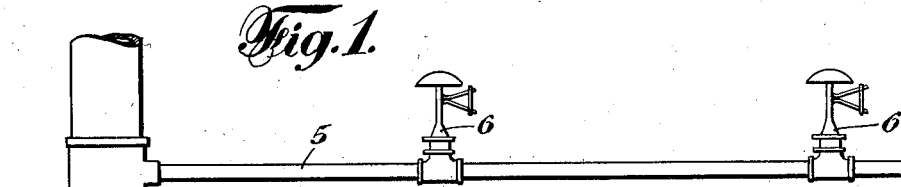
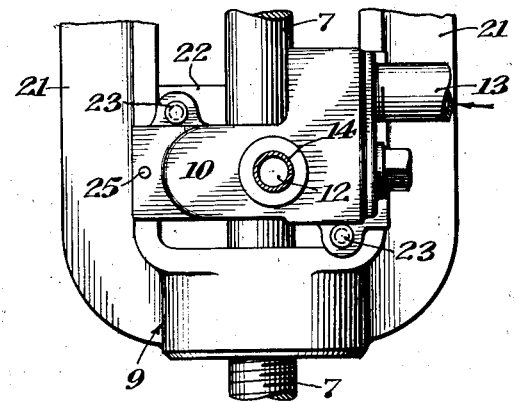
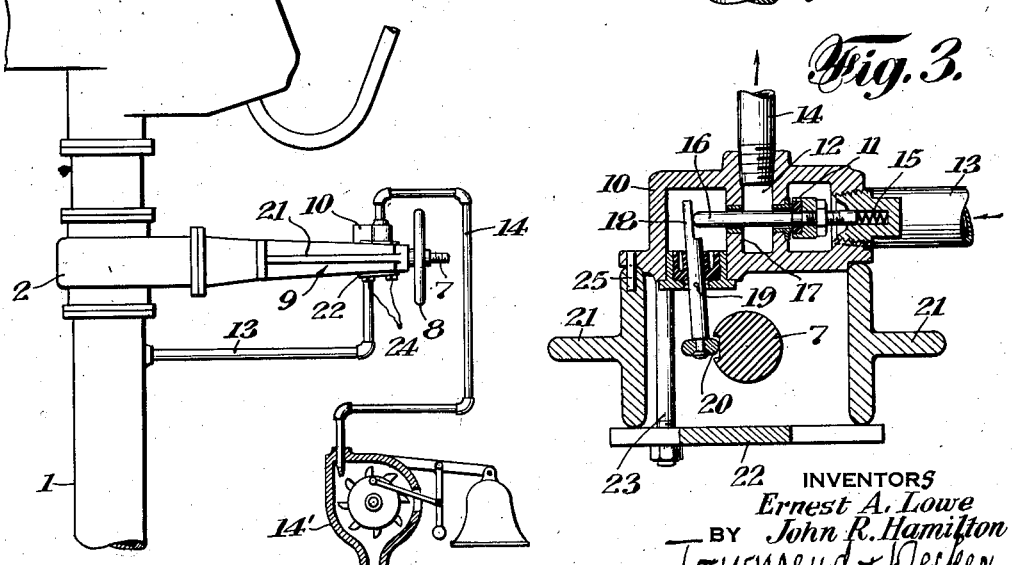
INVENTORS
Ernest A. Lowe
John R. Hamilton
BY Townsend + Decker
ATTORNEYS Patented Feb. 5, 1935

1,990,339

UNITED STATES PATENT OFFICE 1,990,339

GATE VALVE SUPERVISORY DEVICE

Ernest A. Lowe and John R. Hamilton, Cleveland Heights, Ohio, assignors to Automatic Sprinkler Company of America, Cleveland, Ohio, a corporation of Delaware Application August 31, 1932, Serial No. 631,132

3 Claims. (Cl. 277—3)

Our present invention relates to means whereby a signal or indication may be given when a gate valve controlling the supply of fire extinguishing fluid to a fire extinguishing system is moved to shut off the flow of the fluid supplied thereto from a suitable source and admitted to the system by operation of a suitable main valve, usually automatically controlled by conditions of heat in the protected fire zone.

In our prior application filed September 10, 1930, Serial No. 480,900, we have shown an organization wherein the operation of the main gate valve causes the opening of a supplemental valve through which the operating fluid for the alarm or signal is admitted to the latter when the gate valve is operated to cut off the fluid supply.

Our present invention relates to an improvement upon said apparatus and has for its object mainly the simplification of the devices and to provide for the ready attachment of the supplemental valve to existing gate valves by securing the same to the yoke of said gate valve.

A further object is to dispense with the use of a latch for holding said supplemental gate valve in open position.

The invention consists in the details of construction and combination of parts hereinafter more particularly described and claimed:

In the accompanying drawing:

Fig. 1 is a skeleton side elevation showing a fire extinguishing system of typical form to which our present invention is applied.

Fig. 2 is a plan view showing the supplemental valve in position attached to the yoke of the gate valve.

Fig. 3 is a vertical cross-section through said supplemental valve and its means for attachment.

Referring to the drawing 1 indicates a source of fluid supply such as the water supply main for the fluid applied in the extinguisher system, while 2 indicates the casing of a gate valve of ordinary form interposed in the passageway between pipe 1 and the main control valve 3 for the extinguisher system and employed at will to cut off the flow from source 1 to the main control valve 3. From said main valve 3 the usual main distributing pipe 4 leads. At 5 are indicated ordinary branch pipes and at 6 typical forms of sprinkler outlets or nozzles ordinarily constructed to be opened automatically by abnormal heat conditions in a fire zone. The means for controlling the main valve may be of any nature and are not shown.

At 7 is shown a stem of the gate valve equipped with proper means for reciprocating it to open and close the passageway in which it is located. Said operating means here illustrated comprise the usual hand wheel 8 having a hub internally threaded to suitably engage the threaded portion of the valve stem 7 as shown. The wheel has a bearing against the frame or support 9 constituting the yoke between the arms of which the valve stem is mounted, so that on turning the wheel 8 the stem will be moved in one direction or the other according to the direction of movement of said wheel. 10 indicates a valve casing of the supplemental valve, said valve itself being indicated at 11 and being arranged in the valve casing to close a port 12 through which fluid is permitted to pass from a pipe 13 to a pipe 14 on opening of said valve. Pipe 13 conveys fluid under pressure from pipe 1 or other suitable source and pipe 14 conveys fluid admitted through valve 11 to a fluid operated signalling or alarm device of any suitable construction here shown at 14′ as of typical form. Pipes 13 and 14 are suitably joined to the valve casing on the supplemental valve in any usual or desired manner. The fluid pressure in pipe 13 normally holds the valve 11 seated. If desired the seating pressure may be assisted by the spring 15 acting on the valve stem 16. The valve stem 16 for valve 11 reciprocates through suitable watertight bearings in the partitions 17 within the casing.

The valve 11 is moved to open position by means of an engaging lever or other device 18 engaging the valve stem of valve 11 and mounted as shown on the underside of the valve casing. Lever 18 works through a suitable support in a watertight flexible bushing as shown allowing flexibility of movement of the lever while at the same time sealing the opening through which said lever passes. The pivot of the lever may be on the bushing and is indicated at 19. At its lower or exterior end lever 18 is furnished preferably with an anti-friction wheel 20 which normally engages in a suitable depression or undercut in the side of the valve stem 7 thus permitting supplemental valve 11 to be retained on its seat by the pressure from the pipe 13 when the wheel rests in the depression. The depression in the stem is of limited extent so that when movement is communicated to the valve stem to close the gate valve the end of the operating lever 18 will ride out of the depression and be moved positively to cause its upper end within the supplemental valve casing to move supplemental valve stem 16 in a direction to open the supplemental valve 11.

The means for operating supplemental valve thus provided constitute in effect a cam device the shoulder of which is the limiting end of the depression in stem 7. Said cam device affords the positive means for actuating the supplemental valve to open the same against its closing pressure or for permitting said valve to close when the end of lever 18 falls into the depression.

As will be seen it is not necessary to provide any special latching device for locking the valve 11 open since the cam device on the gate valve stem affords a positive lock when moved to position to open the gate valve. When the stem 8 is moved longitudinally to free the valve stem 16 from the locking action of the said cam the pressure admitted through 13 to valve 11 closes the same in the position shown.

In order to permit the supplemental valve to be readily applied to the yokes or arms 21 of the ordinary gate valve there is provided a clamping plate 22 adapted to engage underneath said yokes and held against the same by means of attaching rods or member 23 which depend from the supplemental valve casing or body 10 and are furnished at their lower end with clamping nuts 24 as shown. The lower side or edges of the valve body 10 are located slightly within the inside of the yoke arms 21 to insure stability and locating pins to assist in the assembly and in the holding of the parts together are indicated at 25.

While we have shown our invention as applied to the operation of an alarm operated by fluid pressure admitted through the element forming the supplemental valve of our invention we do not limit ourselves to such use of the combined main or gate valve and supplemental valve, since the fluid passing through a supplemental valve when the main valve of our improved invention is operated might be applied to other uses.

To install this device it is only necessary to provide the gate valve stem with an undercut or depression at a point which will permit the actuating lever 18, when the parts are assembled, to enter the undercut or depression on the valve stem when the valve is in the wide open position. This permits the valve 11 to be held closed by pressure supplied through pipe 13. The undercut is of such length that the end of the actuated lever rides out of it after the stem has been moved from wide open position towards or fully to closed position in which movement the actuating lever will ride out of the groove and in passing over the incline at the end thereof will, by cam action, force the supplemental valve open. In applying the supplemental valve it is located on the yoke to permit the lower end of its actuating lever to rest in said groove. The locating pins assist in this operation. After being located properly the two assembly or clamping bolts 23 and which have been allowed to pass through openings in the lower plate 22 are furnished with the clamping nuts which are then turned to draw up the clamping plate and fasten the device down upon the yokes. An additional dowel pin 25 may be provided for securing supplemental valve body to the gate valve yoke.

In the general operation of the apparatus the gate valve is fully open and the supplemental valve is closed by fluid pressure since in this position of the gate valve stem the lever therefor rides in the depressed portion of the groove or depression in the valve stem 7. When the valve stem 7 is operated towards closing position of said gate valve the operating lever 18 is forced by the cam action of the gate valve stem 7 against the stem of valve 11 and the latter is thereby opened and held positively in open position by the engagement of lever 18 with stem 7 whereupon fluid pressure will pass through pipe 14 to alarm device 14' and give notice that the gate valve is in closed position or has been moved from closed position. When the gate valve is operated to open said valve the actuating lever 18 for the supplemental valve can drop into the depression in the stem 7 of the gate valve and the supplemental valve will then close and remain closed by the fluid pressure from supply 13.

What we claim as our invention is:

1. The combination substantially as described of an axially reciprocating main valve having a depression in the side of its axially moving valve stem, a supplemental valve free to be moved to and retained in closed position by fluid pressure when the main valve is moved away from closed to open position, the pressure for so operating the supplemental valve being derived through connection independent of the main valve, and an operating member for said supplemental valve engaged in said depression when the main valve is open and adapted to be moved by cam action out of the depression to operate the supplemental valve against the fluid pressure normally holding the same closed when said main valve is moved to or towards closed position.

2. The combination of a main valve and supplemental valve constructed and co-operating as specified in claim 1 combined with means for clamping the supplemental valve upon the yoke of the main valve in position with its operating member engaged in the depression upon the exposed or projecting portion of the main valve stem.

3. The combination of an axially reciprocating main valve stem having a depression in its side, a supplemental valve normally held closed by fluid pressure and an operating lever for the latter extending through a water-tight flexible bushing in the casing of the supplemental valve and having a free end engaged with the depression in the side of the main valve stem outside the main valve casing and operable by the movement of the main valve stem in closing the main valve to cause the supplemental valve to open while permitting free movement of said supplemental valve to close under fluid pressure when the main valve stem is moved toward opening position.

ERNEST A. LOWE.
JOHN R. HAMILTON.